United States Patent
Hur

(10) Patent No.: US 7,830,999 B2
(45) Date of Patent: Nov. 9, 2010

(54) APPARATUS AND METHOD OF GENERATING CLOCK SIGNAL OF SEMICONDUCTOR MEMORY

(76) Inventor: Young-Do Hur, San 136-1, Ami-ri, Bubal-eub, Ichon-shi, Gyeonggi-do (KR)

( * ) Notice: Subject to any disclaimer, the term of this patent is extended or adjusted under 35 U.S.C. 154(b) by 984 days.

(21) Appl. No.: 11/647,433

(22) Filed: Dec. 29, 2006

(65) Prior Publication Data

US 2007/0297547 A1     Dec. 27, 2007

(30) Foreign Application Priority Data

Jun. 26, 2006   (KR) .................. 10-2006-0057560

(51) Int. Cl.
*H04L 7/00* (2006.01)

(52) U.S. Cl. ................ 375/354; 375/355; 365/191; 365/193; 365/194; 365/222; 365/203; 327/269; 327/175

(58) Field of Classification Search ............ 327/175, 327/269; 375/238, 370, 372, 355, 354; 365/194, 365/191, 222, 203
See application file for complete search history.

(56) References Cited

U.S. PATENT DOCUMENTS

| | | | |
|---|---|---|---|
| 5,550,499 A | 8/1996 | Eitrheim | |
| 5,638,016 A | 6/1997 | Eitrheim | |
| 7,116,143 B2 | 10/2006 | Deivasigamani et al. | |
| 2006/0202732 A1 | 9/2006 | Deivasigamani et al. | |
| 2006/0209620 A1 | 9/2006 | Deivasigamani et al. | |
| 2006/0220714 A1* | 10/2006 | Hur | 327/175 |

FOREIGN PATENT DOCUMENTS

| | | |
|---|---|---|
| JP | 2004-15810 | 1/2004 |
| KR | 1019990085179 | 12/1999 |
| KR | 1019990086677 | 12/1999 |
| KR | 1020030052650 A | 6/2003 |
| KR | 1020040034984 A | 4/2004 |

\* cited by examiner

*Primary Examiner*—Sudhanshu C Pathak
(74) *Attorney, Agent, or Firm*—Venable LLP; Jeffri A. Kaminski

(57) ABSTRACT

An apparatus for generating a clock signal of a semiconductor memory includes a first shifting unit that outputs first shifting signals using at least one periodic signal, a control signal generating unit that outputs multiplexing control signals using an inverted clock signal, a second shifting unit that outputs second shifting signals using at least one of the periodic signals, a correcting unit that outputs correction signals having an intermediate phase between the phase of the first shifting signals and the phase of the second shifting signals on the basis of a bias signal applied thereto, a combination unit that combines the first shifting signals and the correction signals to output combined signals, a multiplexing unit that selectively outputs the combined signals on the basis of multiplexing control signals, and a driving unit that drives the clock signal and the inverted clock signal based on the output of the multiplexing unit.

18 Claims, 10 Drawing Sheets

500

APPARATUS AND METHOD OF GENERATING CLOCK SIGNAL OF SEMICONDUCTOR MEMORY

BACKGROUND OF THE INVENTION

1. Technical Field

The present invention relates to a semiconductor integrated circuit, in particular, to an apparatus and method of generating a clock signal of a semiconductor memory.

2. Related Art

Referring to FIG. 1, a conventional apparatus for generating a clock signal of a semiconductor memory includes a first shifter 10 that outputs shifting signals P0 to P3 using a plurality of periodic signals C0 to C3 whose phases are different from each other, a second shifter 20 that outputs multiplexing control signals M0 to M3 using an inverted clock signal ICLKB, a multiplexer 30 that selects and outputs one of the shifting signals P0 to P3 on the basis of the multiplexing control signals M0 to M3, and a driver 40 that drives a clock signal ICLK and the inverted clock signal ICLKB on the basis of the output of the multiplexer 30.

The operation of the apparatus for generating a clock signal of a semiconductor memory according to the related art will be described with reference to FIG. 2.

The periodic signals C0 to C3 having a pulse width of 2tck are sequentially input at predetermined phase differences. In this case, phase differences of the periodic signals C1 to C3 with respect to the periodic signal C0 are 90°, 180°, and 270°, respectively.

After the outputs of the first shifter 10 are set by a first reset signal RESET such that the shifting signal P0 is high, and the other shifting signals P1 to P3 are low, the first shifter 10 outputs the shifting signals P0 to P3 having a pulse width of 4tck on the basis of the periodic signals C0 to C3 by the time when the first reset signal RESET is disabled.

Further, after the outputs of the second shifter 20 are set by the first reset signal RESET such that the multiplexing control signal M0 is high, and the other multiplexing control signals M1 to M3 are low, the second shifter 20 outputs the multiplexing control signals M0 to M3 on the basis of the signal ICLKB by the time when the first reset signal RESET is disabled.

Thereafter, the multiplexer 30 selects corresponding shifting signals P0 to P3 when the multiplexing control signals M0 to M3 are high and outputs the clock signal ICLK through the driver 40.

That is, the shifting signal P0 is output as the clock signal ICLK during a period when the multiplexing control signal M0 is high. The shifting signal P3 is output as the clock signal ICLK during a period when the multiplexing control signal M3 is high. The shifting signal P2 is output as the clock signal ICLK during a period when the multiplexing control signal M2 is high. The shifting signal P1 is output as the clock signal ICLK during a period when the multiplexing control signal M1 is high.

As shown in FIG. 2, the pulse widths of the shifting signals P0 to P3 are 4tck, while the phase difference between the shifting signals P0 and P3, the shifting signals P3 and P2, the shifting signals P2 and P1, and the shifting signals P1 and P0 is 5tck, respectively.

However, according to the related art, a high duty cycle of the clock signal ICLK is 4tck (approximately 44%) and a low duty cycle thereof is 5tck (approximately 56%) so that the duty cycle ratio is 44:56. Therefore the duty rate of the clock signal ICLK is not uniform. As a result, since the operational margin of the structure that uses this clock signal only influences the low duty cycle side, the stability is lowered.

SUMMARY OF THE INVENTION

An embodiment of the present invention provides an apparatus and method of generating a clock signal of a semiconductor memory that makes the duty cycle of the clock signal uniform.

An embodiment of the present invention provides an apparatus for generating a clock signal of a semiconductor memory that includes a first shifting unit that outputs first shifting signals using at least one periodic signal; a control signal generating unit that outputs multiplexing control signals using an inverted clock signal; a second shifting unit that outputs second shifting signals using at least one of the periodic signals; a correcting unit that outputs correction signals having an intermediate phase between the phase of the first shifting signals and the phase of the second shifting signals on the basis of a bias signal applied thereto; a combination unit that combines the first shifting signals and the correction signals to output combined signals; a multiplexing unit that selectively outputs the combined signals on the basis of multiplexing control signals; and a driving unit that drives the clock signal and the inverted clock signal on the basis of the output of the multiplexing unit.

An embodiment of the present invention provides a method of generating a clock signal of a semiconductor memory that includes generating a plurality of first shifting signals by increasing a pulse width of a plurality of periodic signals; generating a plurality of second shifting signals having a phase different with respect to the first shifting signals; generating a plurality of correction signals having an intermediate phase between the phase of the first shifting signals and the phase of the second shifting signals; generating a plurality of combined signals having a pulse width larger than that of the first shifting signals by logically combining the first shifting signals and the correction signals; and generating a clock signal whose high duty cycle and low duty cycle match to each other by selectively outputting the plurality of combined signals on the basis of control signals generated by using the plurality of periodic signals.

DESCRIPTION OF EXEMPLARY EMBODIMENT

Hereinafter, preferred embodiments of the present invention will be described in detail with reference to the accompanying drawings.

Figure 1:
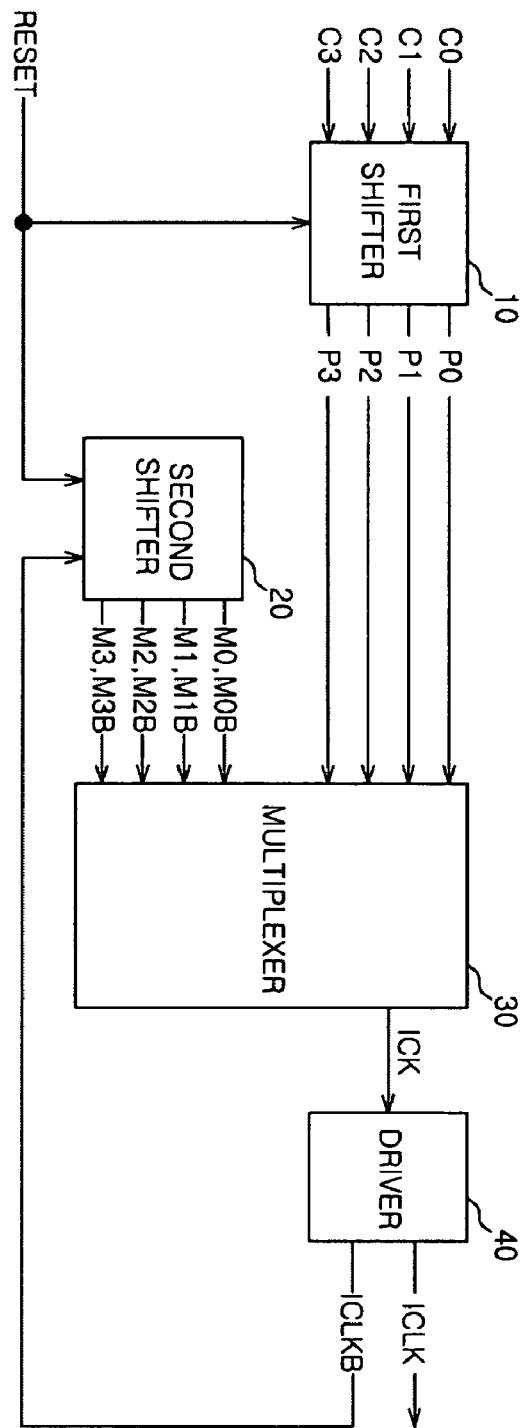
FIG. 1 is a block diagram illustrating an apparatus of generating a clock signal of a semiconductor memory according to the related art.
Figure 2:
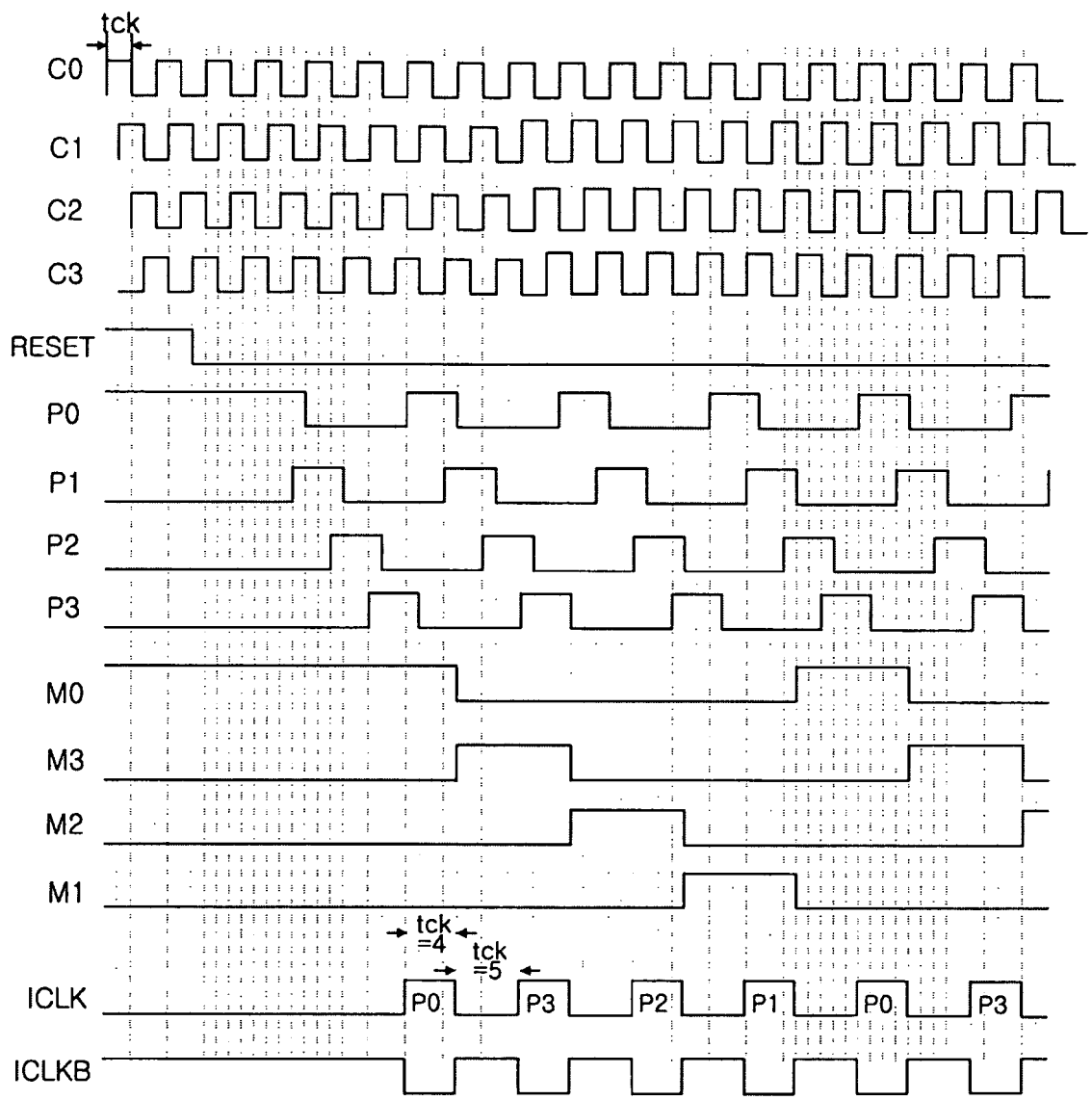
FIG. 2 is an output timing chart of each unit of the apparatus of generating the clock signal of a semiconductor memory according to the related art.
Figure 3:
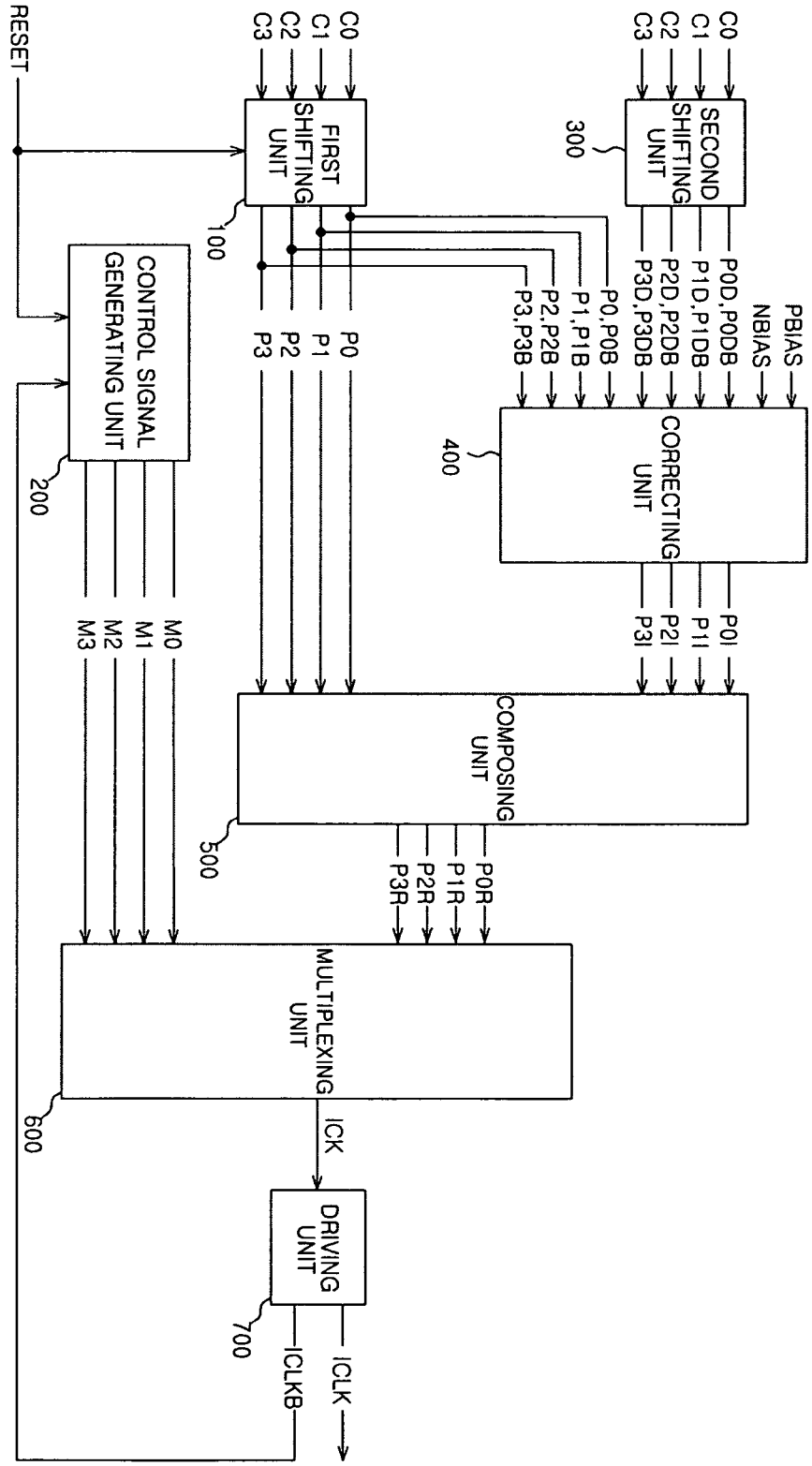
FIG. 3 is a block diagram illustrating a apparatus of generating a clock signal a semiconductor memory according to an exemplary embodiment of the present invention.

Referring to FIG. 3, an apparatus of generating a clock signal in a semiconductor memory includes a first shifting unit 100, a control signal generating unit 200, a second shifting unit 300, a correcting unit 400, a combination unit 500, a multiplexing unit 600, and a driving unit 700.

Figure 4:
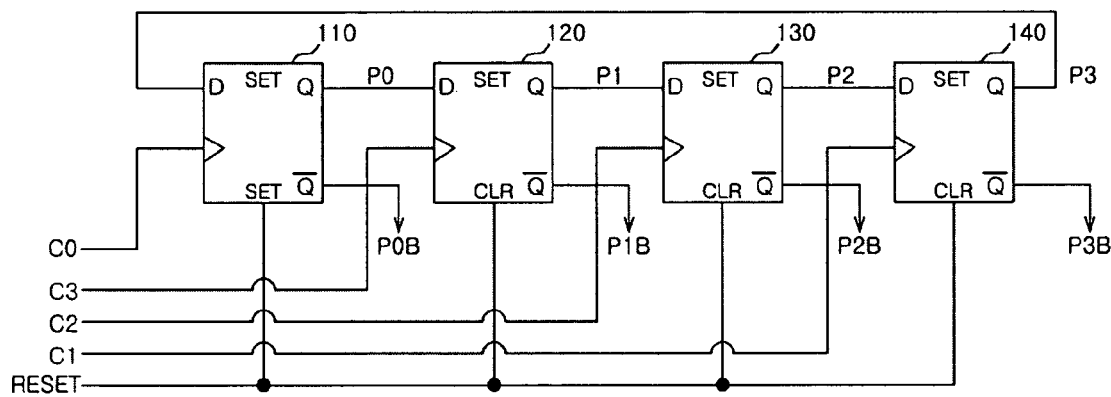
FIG. 4 is a circuit diagram illustrating a first shifting unit shown in FIG. 3.

The first shifting unit 100 outputs first shifting signals P0 to P3 and inverted first shifting signals P0B to P3B on the basis of at least one of periodic signals C0 to C3. Referring to FIG. 4, the first shifting unit 100 includes a flip flop chain configured by a plurality of flip flops 110 to 140 that receive outputs from previous terminals (flip flops) to output the first shifting signals P0 to P3 according to the periodic signals C0 to C3. The first flip flop 110 receives output from the final flip-flop 140 to output the first shifting signal P0. The periodic signals C0 to C3 are input to the flip flops 110 to 140 to determine output timings of the flip flops 110 to 140.

The pulse width of the periodic signals C0 to C3 is 2tck, and phase differences of the periodic signals C1 to C3 with respect to the periodic signal C0 are 90 degrees, 180 degrees, and 270 degrees, respectively.

Figure 5:
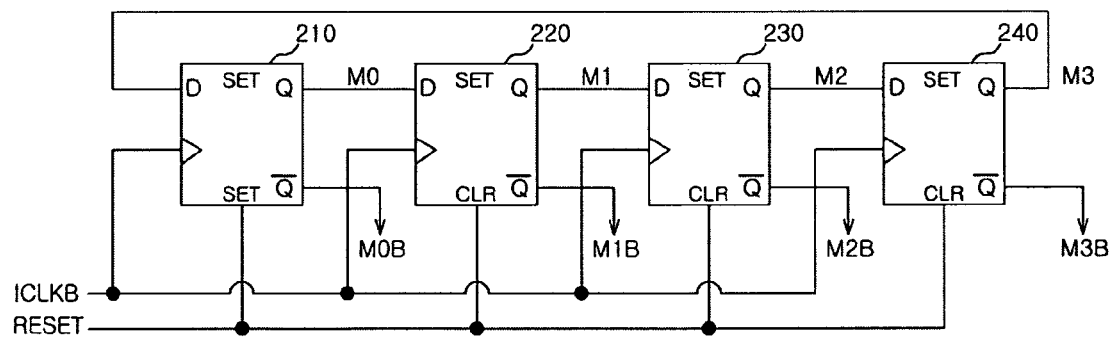
FIG. 5 is a circuit diagram illustrating a control signal generating unit shown in FIG. 3.

The control signal generating unit 200 outputs the multiplexing control signals M0 to M3 on the basis of an inverted clock signal ICLKB. Referring to FIG. 5, the control signal generating unit 200 includes a flip flop chain configured by a plurality of flip flops 210 to 240 that receive outputs from previous terminals (flip flops) to output the multiplexing control signals M0 to M3 according to the inverted clock signal ICLKB. The first flip flops 210 receives output from the final flip-flop 240. The inverted clock signal ICLKB is commonly input to the flip flops 210 to 240 to determine output timings of the flip flops 210 to 240.

Figure 6:
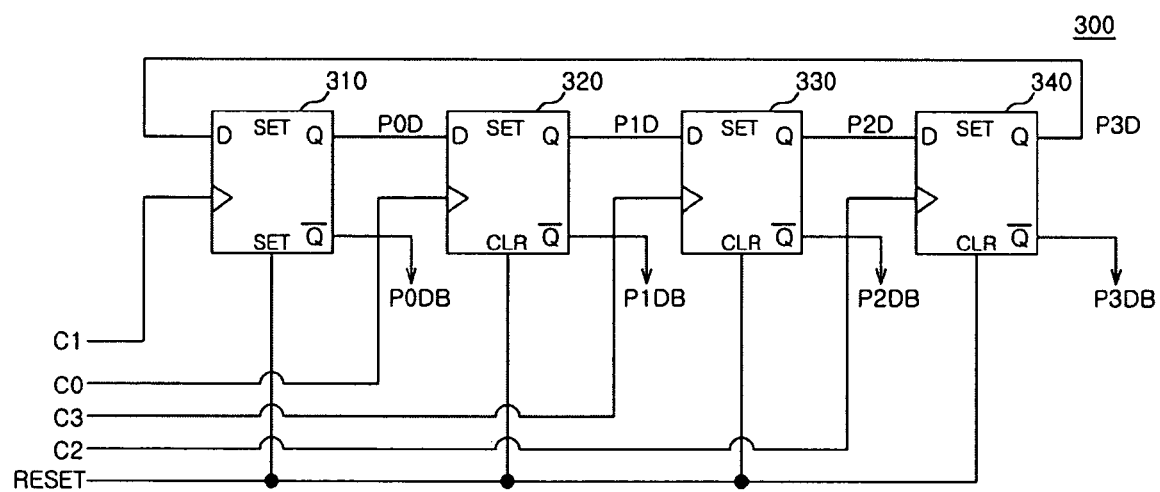
FIG. 6 is a circuit diagram illustrating a second shifting unit shown in FIG. 3.

The second shifting unit 300 outputs second shifting signals P0D to P3D and inverted second shifting signals P0DB to P3DB on the basis of the periodic signals C0 to C3. Referring to FIG. 6, the second shifting unit 300 includes a flip flop chain configured by a plurality of flip flops 310 to 340 that receive outputs from previous terminals (flip flops) to output the second shifting signals P0D to P3D that are delayed by a predetermined time from the shifting signals P0 to P3 according to the periodic signals C0 to C3. The first flip flop 310 receives a output from the final flip-flop 340. The periodic signals C0 to C3 are input to the flip flops 310 to 340 to determine output timings of the plurality of flip flops 310 to 340.

Figure 7:
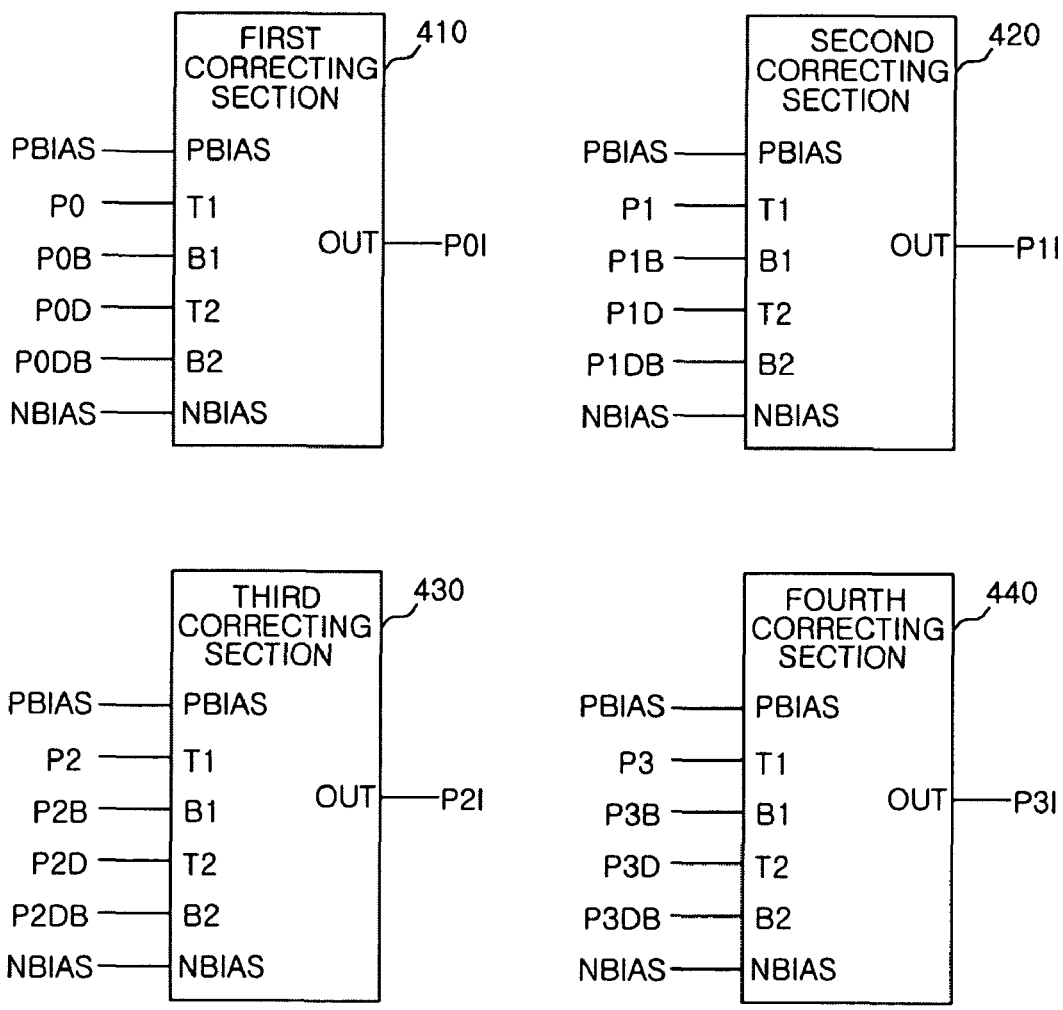
FIG. 7 is an inner block diagram illustrating a correcting unit shown in FIG. 3.

The correcting unit 400 outputs correction signals P0I to P3I having an intermediate phase between the phase of the first shifting signals P0 to P3 and the phase of the second shifting signals P0D to P3D on the basis of a first bias signal PBIAS and a second bias signal NBIAS. The correcting unit 400, as shown in FIG. 7, includes a plurality of correcting sections, that is, first to fourth correcting sections 410 to 440 that correspondingly interpolate the first shifting signals P0 to P3 and the second shifting signals P0D to P3D, respectively, on the basis of the first bias signal PBIAS and the second bias signal NBIAS to have an intermediate phase and output the correction signals P0I to P3I.

Figure 8:
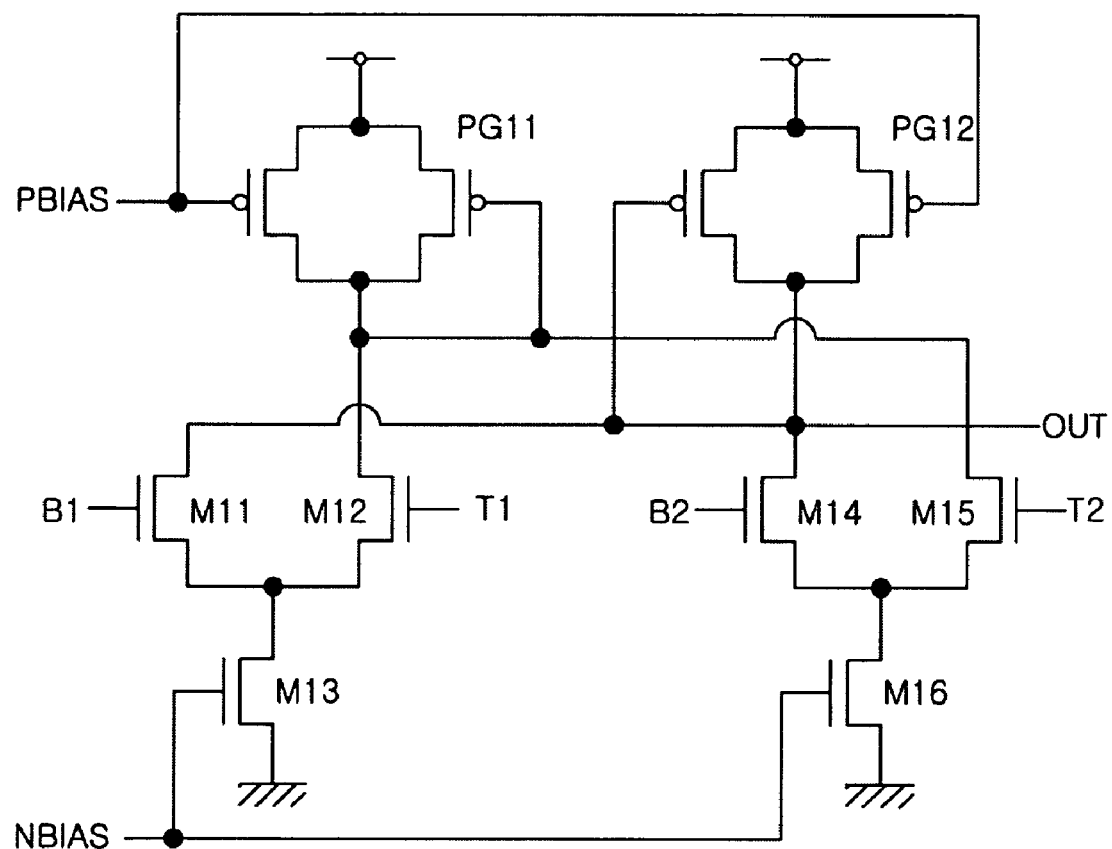
FIG. 8 is a circuit diagram illustrating a first correcting section shown in FIG. 7.

Referring to FIG. 8, the first correcting section 410 includes, as an interpolating circuit, a first pass gate PG11 in which a power supply is input to an input terminal, the first bias signal PBIAS is input to a first control terminal, and an output terminal and a second control terminal are connected to each other and a first transistor M11 having a drain connected to an output terminal OUT for the correction signal P0I and the inverted first shifting signal P0B is input to a gate B1. The first correcting section 410 further includes a second transistor M12 having a drain connected to an output terminal of the first pass gate PG11 and the first shifting signal P0 is input to a gate T1, and a third transistor M13 in which a source is grounded, and the second bias signal NBIAS is input to a gate, and a drain of the third transistor M13 and the sources of the first and second transistors M11 and M12 are connected to a common node. The first correcting section 410 further includes a second pass gate PG12 in which a power supply is input to an input terminal, the first bias signal PBIAS is input to a first control terminal, and an output terminal and a second control terminal are connected to the output terminal OUT for the correction signal P0I and a fourth transistor M14 in which a drain is connected to the output terminal OUT for the correction signal P0I and the inverted second shifting signal P0DB is input to a gate B2. The first correcting section 410 further includes a fifth transistor M15 in which a drain is connected to the output terminal of the first pass gate PG11 and the second shifting signal P0D is input to a gate T2, and a sixth transistor M16 in which a source is grounded, and the second bias signal NBIAS is input to a gate, and a drain of the sixth transistor M16 and the sources of the fourth and fifth transistors M14 and M15 are connected to a common node.

Since the second to fourth correcting sections 420 to 440 have the same structure as the first correcting section 410 except for the input signals, the description thereof will be omitted.

The first bias signal PBIAS has a level that is capable of turning on the first and second pass gates PG11 and PG12, and the second bias signal NBIAS has a level that is capable of turning on the third and sixth transistors M13 and M16.

Figure 9:
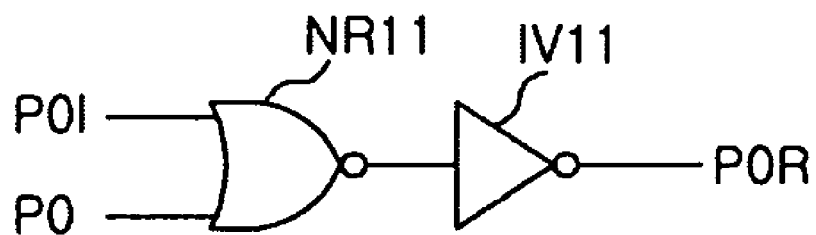
FIG. 9 is a circuit diagram illustrating a combination unit shown in FIG. 3.
Figure 9:
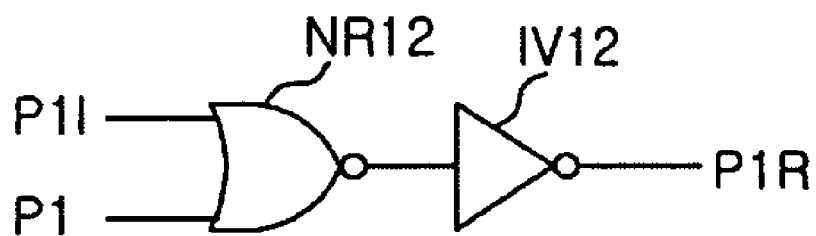
Figure 9:
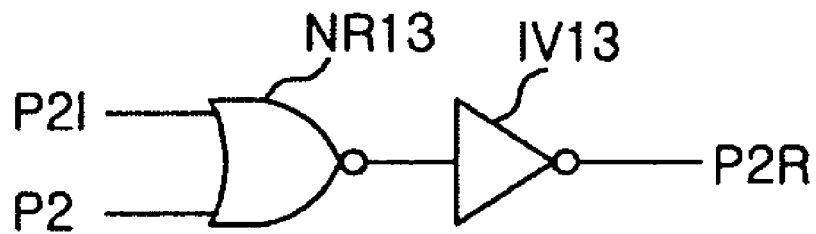
Figure 9:
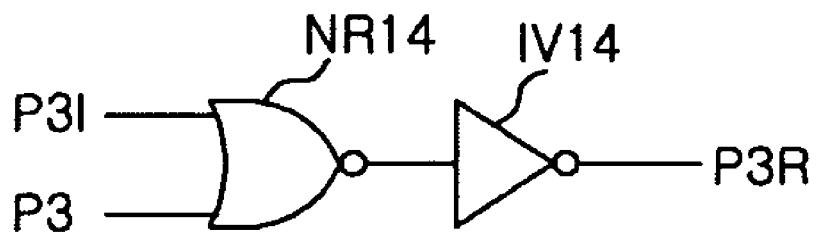

The combination unit 500 combines, that is, logically adds the first shifting signals P0 to P3 and the correction signals P0I to P3I to output combined signals P0R to P3R. The combination unit 500, as shown in FIG. 9, is configured by a logical circuit that logically adds the correction signals P0I to P3I and first shifting signals P0 to P3 corresponding to the correction signals P0I to P3I, respectively, to output the combined signals P0R to P3R. The logical circuit may be configured by a plurality of NOR gates NR11 to NR14 and a plurality of inverters IV11 to IV14. The inverters IV11 to IV14 receive output signals of the NOR gates NR11 to NR14, respectively.

Figure 10:
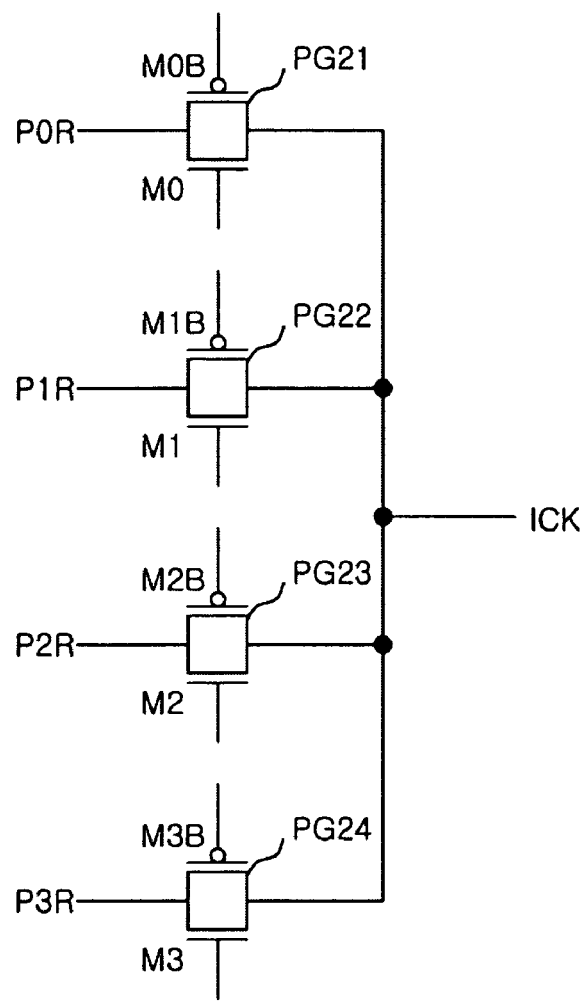
FIG. 10 is a circuit diagram illustrating a multiplexing unit shown in FIG. 3.

The multiplexing unit 600 selectively outputs the combined signals P0R to P3R according to the multiplexing control signals M0 to M3 and M0B to M3B. The multiplexing control signals M0B to M3B are inverted multiplexing control signal M0 to M3. The multiplexing unit 600, as shown in FIG. 10, includes a plurality of pass gates PG21 to PG24 that receive the combined signals P0R to P3R for every bit to output according to the multiplexing control signals M0 to M3 and M0B to M3B.

Figure 11:
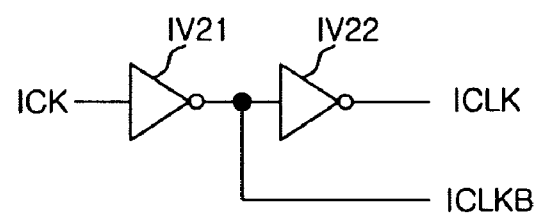
FIG. 11 is a circuit diagram illustrating a driving unit shown in FIG. 3.

The driving unit 700 drives the clock signal ICLK and the inverted clock signal ICLKB according to the output ICK of the multiplexing unit 600. The driving unit 700, as shown in FIG. 11, includes a first inverter IV21 that receives the output ICK from the multiplexing unit 600 to output the inverted clock signal ICLKB, and a second inverter IV22 that receives the output from the first inverter IV21 to output the clock signal ICLK.

Hereinafter, the operation of the apparatus of generating the clock signal according to an embodiment of the invention will be described with reference to FIG. 12.

First, the periodic signals C0 to C3 are input with a predetermined phase difference. As above described, the phase differences of the periodic signals C1 to C3 with respect to the periodic signal C0 are 90 degrees, 180 degrees, and 270 degrees, respectively.

The outputs of the first shifting unit 100 are set by a first reset signal RESET such that the first shifting signal P0 is high, and the first shifting signals P1 to P3 are low. And then, the first shifting unit 100 outputs the first shifting signals P0 to P3 and inverted first shifting signals P0B to P3B having a pulse width of 4tck on the basis of the periodic signals C0 to C3 after the first reset signal RESET is disabled.

Meanwhile, the outputs of the second shifting unit 300 are set by the first reset signal RESET such that the second shifting signal P0D is high, and the second shifting signals P1D to P3D are low. And then the second shifting unit 300 outputs the second shifting signals P0D to P3D and inverted second shifting signals P0DB to P3DB, that have 90° phase differences (are delayed by 1tck) with respect to the first shifting signals P0 to P3 and the inverted first shifting signals P0B to P3B, according to the periodic signals C0 to C3 after the first reset signal RESET is disabled.

The periodic signal C0 is input to the flip flop 110 that first operates to output the first shifting signal P0. In contrast, the periodic signal C1 having a phase difference of 90° with respect to the periodic signal C0 is input to the flip flop 310 that first operates to output the second shifting signal P0D. Therefore, the phase difference between the first shifting signal P0 and the second shifting signal P0D is 90°, and thus the phase difference between the first shifting signals P0 to P3 and the second shifting signals P0D to P3D is 90°.

Figure 12:
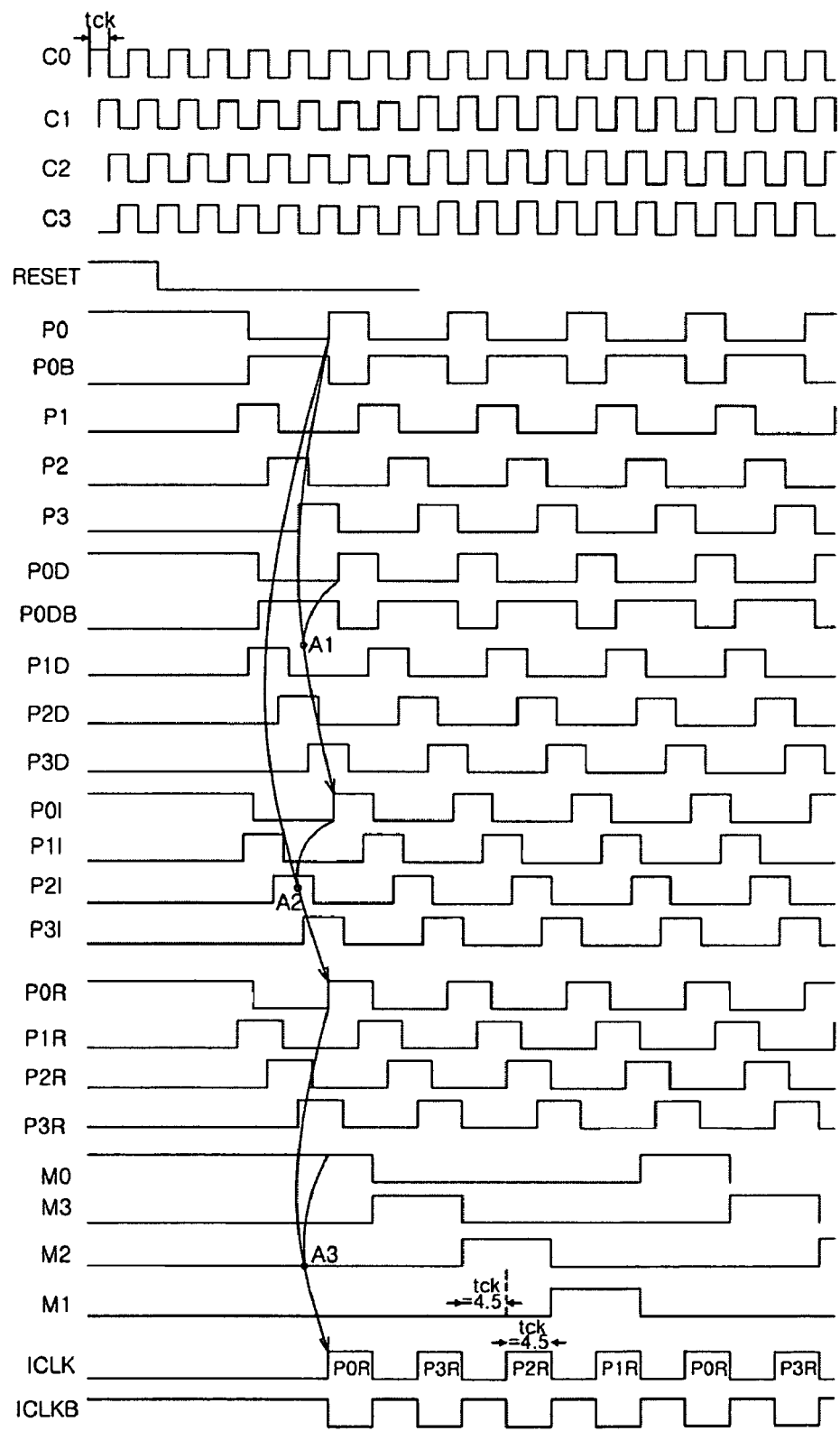
FIG. 12 is an output timing chart of each unit of the apparatus of the clock signal of the semiconductor memory according to an exemplary embodiment of the present invention.

The correcting unit 400 interpolates the first shifting signals P0 to P3 and the second shifting signals P0D to P3D according to the first bias signal PBIAS and second bias signal NBIAS, to output the correction signals P0I to P3I having an intermediate phase between the phases of the first shifting signals P0 to P3 and the second shifting signals P0D to P3D as indicated by A1 in FIG. 12.

By using the first to fourth correcting sections 410 to 440 shown in FIG. 7, each configured by the interpolating circuit shown in FIG. 8, the first shifting signal P0 and the inverted first shifting signal P0D, the first shifting signal P1 and the inverted first shifting signal P1D, the first shifting signal P2 and the inverted first shifting signal P2D, and the first shifting signal P3 and the inverted first shifting signal P3D are interpolated to output the correction signals P0I, P1I, P2I, and P3I, respectively. In this case, the phase of the correction signal P0I to P3I is 45° (0.5tck) later than the first shifting signals P0 to P3, and 45° earlier than the inverted first shifting signals P0D to P3D. As a result, a falling edge of the correction signals P0I to P3I is 0.5tck later than a falling edge of the first shifting signals P0 to P3.

Sequentially, as indicated by A2 in FIG. 12, the combination unit 500 logically adds the correction signals P0I to P3I and the first shifting signals P0 to P3 to output the combined signals P0R to P3R.

Therefore, since the combined signals P0R to P3R are obtained by logically adding the first shifting signals P0 to P3 to the correction signals P0I to P3I whose falling edge is delayed by the correcting unit 400, the pulse width of the combined signals P0R to P3R is 4.5tck.

The outputs of the control signal generating unit 200 are set by the first reset signal RESET such that the multiplexing control signal M0 is high. And then the other multiplexing control signals M1 to M3 are low, the control signal generating unit 200 outputs the multiplexing control signals M0 to M3 and M0B to M3B using the inverted clock signal ICLKB after the first reset signal RESET is disabled.

The multiplexing unit 600 selects the combined signals P0R to P3R when the multiplexing control signals M0 to M3 are high (when M0B to M3B are low), to output the output ICK. The driving unit 700 drives the output ICK to output the clock signal ICLK and the inverted clock signal ICLKB as indicated by A3 in FIG. 12.

That is, the combined signal P0R is selected during a period when the multiplexing control signal M0 is high (M0B is low), the combined signal P3R is selected during a period when the multiplexing control signal M3 is high, the combined signal P2R is selected during a period when the multiplexing control signal M2 is high, and the combined signal P1R is selected during a period when the multiplexing control signal M1 is high to output the clock signal ICLK and the inverted clock signal ICLKB.

As described above, the high duty cycle and the low duty cycle of the clock signal ICLK are the same as 4.5tck. That is, the duty rate is 50:50.

Namely, according to an embodiment of the invention, the first shifting signals P0 to P3 and the second shifting signals P0D to P3D that are 1tck later than the first shifting signals P0 to P3 are interpolated to generate the correction signals P0I to P3I whose falling edge is delayed. And then the correction signals P0I to P3I are logically added to the first shifting signals P0 to P3 to generate the combined signals P0R to P3R, the combined signals P0R to P3R are multiplexed, to output clock signal ICLK. Therefore, the high duty time of the clock signal ICLK is increased, and finally, the high duty cycle and the low duty cycle of the clock signal ICLK are equal to each other.

It will be apparent to those skilled in the art that various modifications and changes may be made without departing from the scope and spirit of the present invention. Therefore, it should be understood that the above embodiments are not limiting, but illustrative in all embodiments. The scope of the present invention is defined by the appended claims rather than by the description preceding them, and therefore all changes and modifications that fall within metes and bounds of the claims, or equivalents of such metes and bounds are therefore intended to be embraced by the claims.

According to the apparatus and method of generating a clock signal of a semiconductor memory according to an embodiment of the invention, since the duty cycle of the clock signal that is finally output is uniform, it is possible to perform stable operations by increasing the operational margin of the device using the duty cycle of the clock signal.

What is claimed is:

1. An apparatus for generating a clock signal of a semiconductor memory comprising:

a first shifting unit configured to output first shifting signals having a phase using at least one of a plurality of periodic signals;

a control signal generating unit configured to output multiplexing control signals using an inverted clock signal;

a second shifting unit configured to output second shifting signals having a phase using at least one of the periodic signals;

a correcting unit configured to output correction signals having an intermediate phase between the phase of the first shifting signals and the phase of the second shifting signals on the basis of first and second bias signals applied thereto;

a combination unit configured to combine the first shifting signals and the correction signals, to output combined signals;

a multiplexing unit configured to selectively output the combined signals according to multiplexing control signals; and a driving unit configured to drive the clock signal and the inverted clock signal on the basis of the combined signals output of the multiplexing unit.

2. The apparatus of claim 1, wherein at least one of the periodic signals has a different phase from the others.

3. The apparatus of claim 1, wherein the first shifting unit is a flip flop chain comprising a plurality of flip flops having respective inputs coupled to a respective output of a previous flip-flop in the chain, wherein a first flip flop in the chain has its input coupled to an output of a final flip-flop in the chain, to output the first shifting signals on the basis of the periodic signals.

4. The apparatus of claim 1, wherein the control signal generating unit is a flip flop chain comprising a plurality of flip flops having respective inputs coupled to a respective output of a previous flip-flop in the chain, a first flip-flop in the chain having its input coupled to an output of a final flip-flop in the chain, to output the multiplexing control signals on the basis of the inverted clock signal.

5. The apparatus of claim 1, wherein the second shifting unit is a flip flop chain configured by a plurality of flip flops having respective inputs coupled to a respective output of a previous flip-flop in the chain, a first flip-flop in the chain having its input coupled to an output of a final flip-flop in the chain, to output the second shifting signals on the basis of the periodic signals.

6. The apparatus of claim 5, wherein the second shifting signals are delayed by a predetermined time from the first shifting signals.

7. The apparatus of claim 1, wherein the order of inputting the periodic signals in the second shifting unit is different from the order of inputting the periodic signals in the first shifting unit.

8. The apparatus of claim 1, wherein the correcting unit includes a plurality of correcting sections configured to interpolate the first shifting signals and the second shifting signals corresponding to the first shifting signals on the basis of the first bias signal and the second bias signal to have the intermediate phase and output the correction signals.

9. The apparatus of claim 8, wherein each of the correcting sections includes:

a first pass gate having an input terminal configured to receive a power supply, the first bias signal a first control terminal, and an output terminal and a second control terminal, which are connected to each other;

a first transistor having a source, a drain configured to receive the correction signal and a gate configured to receive an inverted first shifting signal;

a second transistor having a source, a drain connected to the output terminal of the first pass gate and a gate configured to receive the first shifting signal;

a third transistor having a source that is grounded, and a gate configured to receive the second bias signal, and a drain coupled to the sources of the first and second transistors;

a second pass gate having an input terminal configured to receive the power supply, a control terminal configured to receive the first bias signal, and an output terminal and a second control terminal configured to receive the correction signal;

a fourth transistor having a source, a drain configured to receive the correction signal and a gate configured to receive an inverted second shifting signal;

a fifth transistor having a source, a drain connected to the output terminal of the first pass gate and a gate configured to receive the second shifting signal; and a sixth transistor having a source that is grounded, and a gate configured to receive the second bias signal, and a drain coupled to the sources of the fourth and fifth transistors.

10. The apparatus of claim 9, wherein the first control terminal and the second control terminal of the first pass gate and the second pass gate are P type gates.

11. The apparatus of claim 1, wherein the combination unit comprises a logical circuit configured to logically add the correction signals and corresponding first shifting signals to output the combined signals.

12. The apparatus of claim 1, wherein the multiplexing unit includes a plurality of pass gates configured to receive the combined signals for every bit to be output according to the multiplexing control signals.

13. The apparatus of claim 1, wherein the driving unit includes:

a first inverter configured to receive the combined signals output from the multiplexing unit to output the inverted clock signal; and a second inverter configured to receive the inverted clock signal from the first inverter to output the clock signal.

14. A method of generating a clock signal of a semiconductor memory, comprising:

generating a plurality of first shifting signals having a pulse width by increasing a pulse width of a plurality of periodic signals;

generating a plurality of second shifting signals having a phase different than a phase of the first shifting signals;

generating a plurality of correction signals having an intermediate phase between a phase of the first shifting signals and the phase of the second shifting signals;

generating a plurality of combined signals having a pulse width larger than that of the first shifting signals by logically operating on the first shifting signals and the correction signals; and generating a clock signal whose high duty cycle and low duty cycle match each other by selectively outputting the combined signals on the basis of control signals generated by using the periodic signals.

15. The method of claim 14, wherein the generating of the first shifting signals comprises repeatedly outputting a previous signal as a next signal so as to match a shifting timing of the periodic signal according to a first order.

16. The method of claim 14, wherein the generating of the second shifting signals comprises repeatedly outputting a previous signal as a next signal so as to match a shifting timing of the periodic signal according to a second order.

17. The method of claim 14, wherein the generating of the correction signal includes:

generating a rising edge corresponding to an intermediate phase between rising edges of the first shifting signals and rising edges of the second shifting signals; and generating a falling edge corresponding to an intermediate phase between falling edges of the first shifting signals and falling edges of the second shifting signals.

18. The method of claim 14, wherein the generating of the combined signal includes logically adding the first shifting signals and the correction signals.

* * * * *